(12) United States Patent
Yasui et al.

(10) Patent No.: US 6,318,188 B1
(45) Date of Patent: Nov. 20, 2001

(54) TORQUE DETECTOR

(75) Inventors: Katsuaki Yasui; Masahiko Hasegawa; Yasushi Hisaoka, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/457,706

(22) Filed: Dec. 10, 1999

(30) Foreign Application Priority Data

Jun. 1, 1999 (JP) .................................................. 11-154318

(51) Int. Cl.[7] ...................................................... G01L 3/02
(52) U.S. Cl. ...................................................... 73/862.333
(58) Field of Search ...... 73/862.333, 862.331–862.336; 324/207

(56) References Cited

U.S. PATENT DOCUMENTS 4,649,341 * 3/1987 Ulbrich et al. ........................ 324/207
5,712,563 * 1/1998 Kawagoe et al. ................ 324/207.19
5,831,180 * 11/1998 Tanaka et al. ................... 73/862.333

FOREIGN PATENT DOCUMENTS 1-180737   12/1989  (JP) .

* cited by examiner

*Primary Examiner*—Benjamin R. Fuller
*Assistant Examiner*—Jewel V. Thompson
(74) *Attorney, Agent, or Firm*—Sughrue, Mion, Zinn, Macpeak & Seas, PLLC

(57) ABSTRACT

A torque detector having a simple structure, high accuracy and high rigidity.

The torque detector comprises movable bodies whose both ends are fixed to or supported by the first shaft and the second shaft, which are arched and whose center portions are displaced by a change in the curvature of the arch due to a change in the distance between the fixed both ends of the movable bodies according to a relative torsion angle between the first shaft and the second shaft.

18 Claims, 6 Drawing Sheets

TORQUE DETECTOR

BACKGROUND OF THE INVENTION

1. [Field of the Invention]

The present invention relates to a torque detector for detecting torque without contact when external force is applied to a rotary shaft in a car power steering system or the like.

2. [Description of the Prior Art]

In a car power steering system, it is necessary to detect torque applied to a steering wheel so as to determine the amount of power assist. A torque detector for this purpose is disclosed by Japanese Laid-open Utility Patent No. 1-180737. The structure of this torque detector will be described with reference to FIG. 6. In FIG. 6, reference numeral 1 denotes a first shaft connected to an unshown steering wheel, 2 a second shaft connected to the unshown pinion gear of a steering unit, 3 a torsion bar for elastically connecting the two shafts in a torsion direction, 4 a cylindrical case, 5 a bobbin stored in the case, 6 bearings for fixing the shaft 1 in the case 4 in such a manner that the shaft 1 can rotate freely, 11 and 12 first and second cylinders made from a soft magnetic material and fixed to the first shaft 1, 13 and 14 third and fourth cylinders made from a soft magnetic material and fixed to the second shaft 2, 11a to 14a tooth portions provided on the first to fourth cylinders, and 21a to 21d first to fourth coils wound in the bobbin 5.

A description is subsequently given of the operation of this torque detector. When torque is applied to the first shaft 1 from the steering wheel, the torsion deformation of the torsion bar 3 occurs and a relative angular difference is generated between the first shaft 1 and the second shaft 2. Then, relative displacement between the first cylinder 11 and the third cylinder 13 fixed to the respective shafts occurs in a circumferential direction, and the area forming a magnetic path between the opposite tooth portions 11a and 13a provided on the respective cylinders is changed, resulting in a variation in the inductance of the first coil 21a. The torque can be obtained by detecting this variation in the inductance by means of an unshown detection circuit.

However, as the inductance of the first coil 21a is changed not only by torque but also by temperature, the third coil 21c whose inductance is changed not by the torsion of the torsion bar but by temperature only in the same manner as the first coil 21a is provided and temperature compensation is made by detecting the inductance of the third coil 21c.

As described above, torque on which temperature compensation has been made can be measured with the first detection set comprising the first and third cylinders and the first and third coils. However, the torque detector of this prior art comprises a second detection set.

Since the second cylinder 12 and the fourth cylinder 14 are fixed to the first shaft 1 and the second shaft 2, respectively, like the first detection set, they constitute the second detection set with the second and fourth coils, and the second detection set operates in the same manner as the first detection set. Therefore, the torque detector has a double safety function which enable the system to operate with the output of the other detection set when a failure such as disconnection occurs in either one of the detection sets.

SUMMARY OF THE INVENTION

Since the torque detector of the prior art is constituted as described above, the first to fourth cylinders have a complex shape with a large number of tooth portions. Further, since high dimensional accuracy is required for the torque detector, the production cost of the torque detector becomes high.

Since the change rate of magnetic resistance due to a change in the area between the opposite tooth portions caused by relative displacement between the cylinders in a circumferential direction cannot be made so large, it is difficult to improve the sensitivity of the torque detector and the torque detector is readily influenced by error factors such as temperature variations.

Further, since the sensitivity of the torque detector is low, the torsion angle of the torsion bar with respect to given torque must be increased to change the area between the opposite tooth portions, thereby making it impossible to increase the rigidity of the torsion bar. Therefore, when the torque detector is used in a car power steering system, an indefinite and unreliable operation feeling is obtained.

It is an object of the present invention which has been made to solve the above problem to provide a torque detector having a simple structure, high accuracy and high rigidity.

According to a first aspect of the present invention, there is provided a torque detector for detecting torque applied to first and second shafts which are arranged coaxial to each other and whose ends are opposed to each other, which comprises an elastic member which is connected to the first and second shafts and displaced by torque having a torsion direction between the first and second shafts, movable bodies whose both ends are fixed to or supported by the first shaft and the second shaft, which are arched and whose center portions are displaced by a change in the curvature of the arch due to a change in the distance between both fixed ends of the movable bodies according to a relative torsion angle between the first shaft and the second shaft, and means of detecting the displacement of each of the movable bodies.

According to a second aspect of the present invention, there is provided a torque detector wherein the movable bodies are arched along the circumferential directions of the first and second shafts.

According to a third aspect of the present invention, there is provided a torque detector wherein the movable bodies are arched in either one of the longitudinal directions of the first and second shafts.

According to a fourth aspect of the present invention, there is provided a torque detector wherein the movable bodies are made from a magnetic material and means of detecting the displacement of each of the movable bodies magnetically is provided.

According to a fifth aspect of the present invention, there is provided a torque detector wherein the movable bodies are made from a conductive material and means of detecting the displacement of each of the movable bodies with an eddy current generated in the movable body is provided.

According to a sixth aspect of the present invention, there is provided a torque detector wherein the movable bodies are made of an amorphous belt.

According to a seventh aspect of the present invention, there is provided a torque detector wherein the elastic member is shaped like a rod, a cylindrical support member is provided around the elastic member, an end portion connected to the elastic member of the first shaft is extended along the elastic member, the extension portion is inserted into the support member, the support member is fixed to an end portion of the second shaft, one ends of the movable bodies are connected to the extension portion of the first shaft through an opening formed in the support member, and the other ends of the movable bodies are connected to the support member.

According to an eighth aspect of the present invention, there is provided a torque sensor wherein the extension portion is a cylindrical portion located around the elastic member and an end portion of this cylindrical portion is mated with a hole formed in the end portion of the second shaft in such a manner that it can rotate freely.

The above and other objects, features and advantages of the invention will become more apparent from the following description when taken in conjunction with the accompanying drawings.

BRIEF DESCRIPTION OF THE ACCOMPANYING DRAWINGS

DETAILED DESCRIPTION OF THE PREFERRED EMBODIMENTS

Embodiment 1

Figure 1:
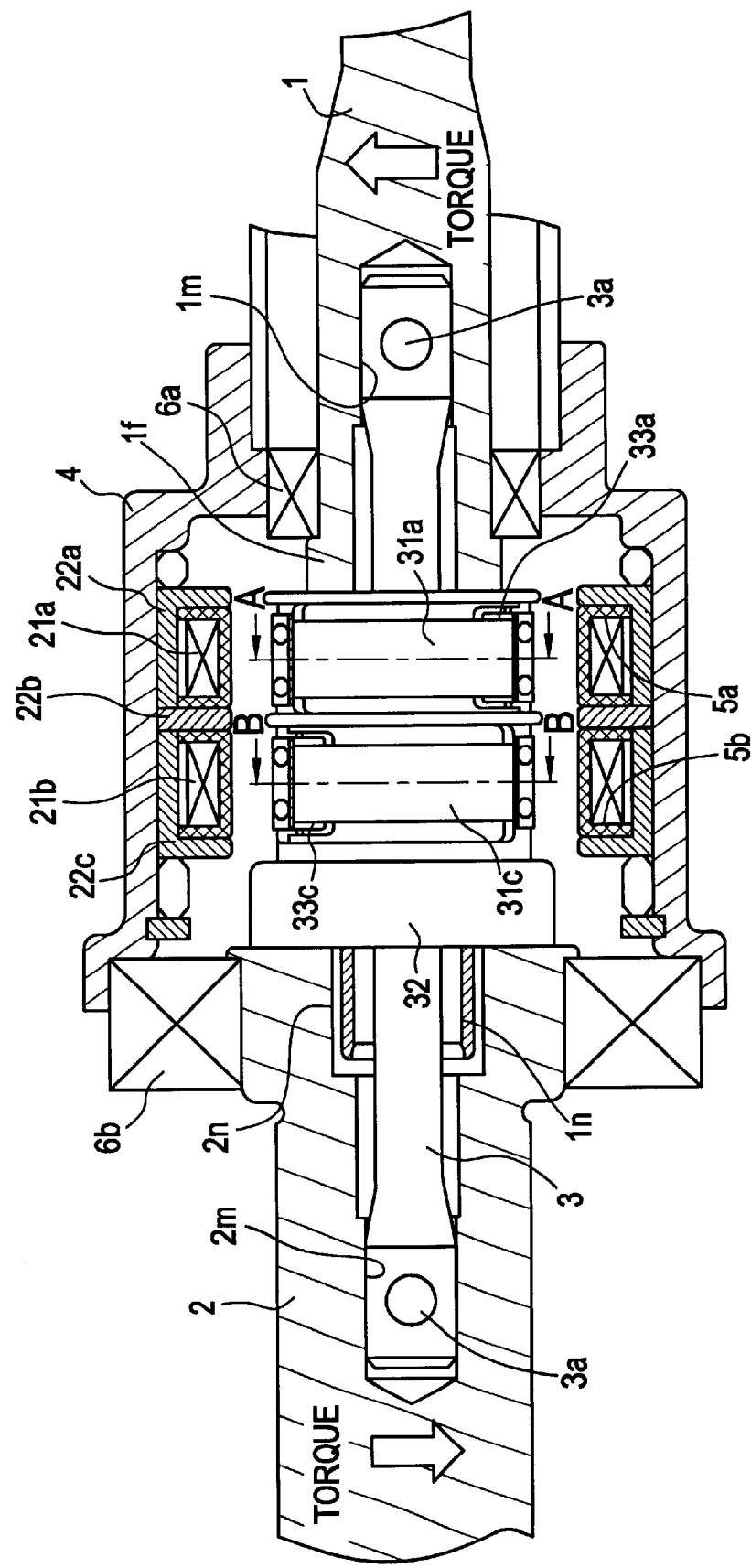
FIG. 1 is an elevation partly in section of a torque detector according to Embodiment 1 of the present invention.
Figure 6:
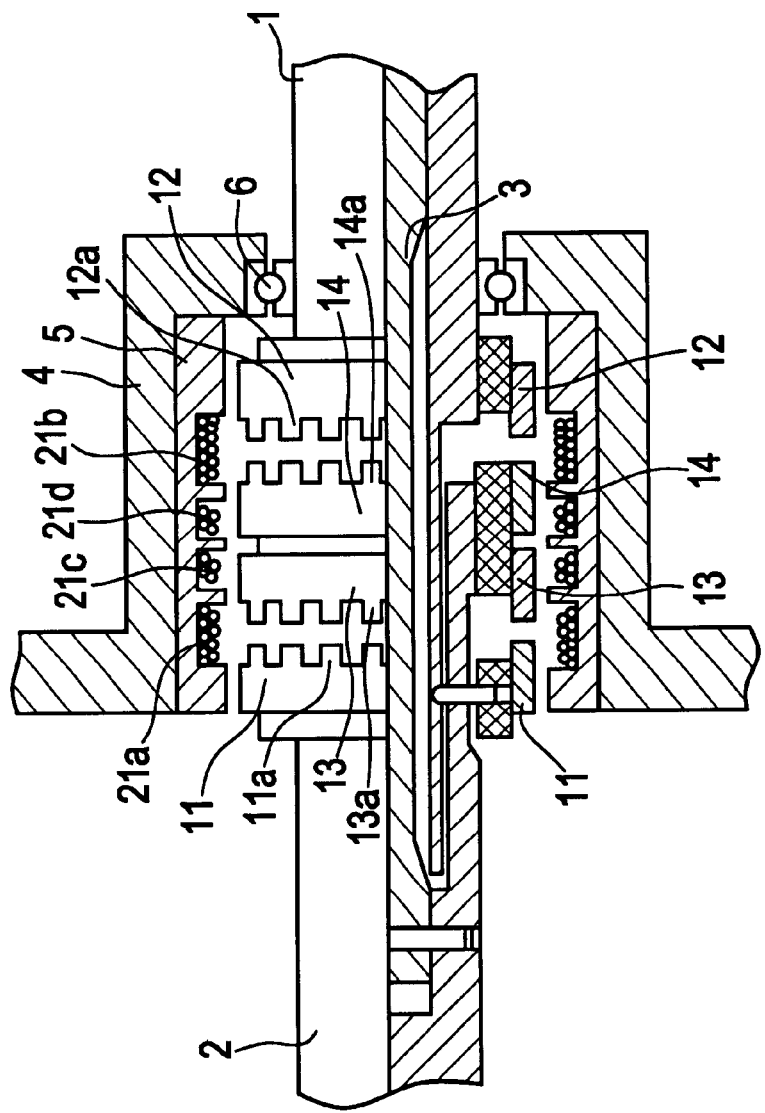
FIG. 6 is an elevation partly in section of a torque detector of the prior art.

FIG. 1 is an elevation partly in section of a torque detector according to Embodiment 1 of the present invention. In FIG. 1, the same or corresponding members and parts as those of FIG. 6 of the prior art are given the same reference symbols.

In FIG. 1, reference numeral 1 denotes a first shaft connected to an unshown steering wheel and 2 a second shaft connected to the unshown pinion gear of a steering unit, all of which are located on both sides of a cylindrical case 4 in such a manner that they can rotate freely by bearings 6a and 6b. Denoted by 3 is a torsion bar, connected to end portions opposed to each other of the first shaft 1 and the second shaft 2 and arranged on the center axes of the first shaft 1 and the second shaft 2, for elastically connecting the two shafts in a torsion direction, 5a and 5b bobbins provided on the inner wall of the case 4, 21a and 21b first and second coils wound round the bobbins 5a and 5b, respectively, 22a to 22c yokes made from a soft magnetic material to cover the exteriors of the coils 21a and 21b, 32 a support member whose left end is fixed to the second shaft 2 (see FIG. 2), and 33a to 33d fixing members fixed to the peripheral surface of the first shaft 1 and projecting from an opening formed in the support member 32.

Figure 3:
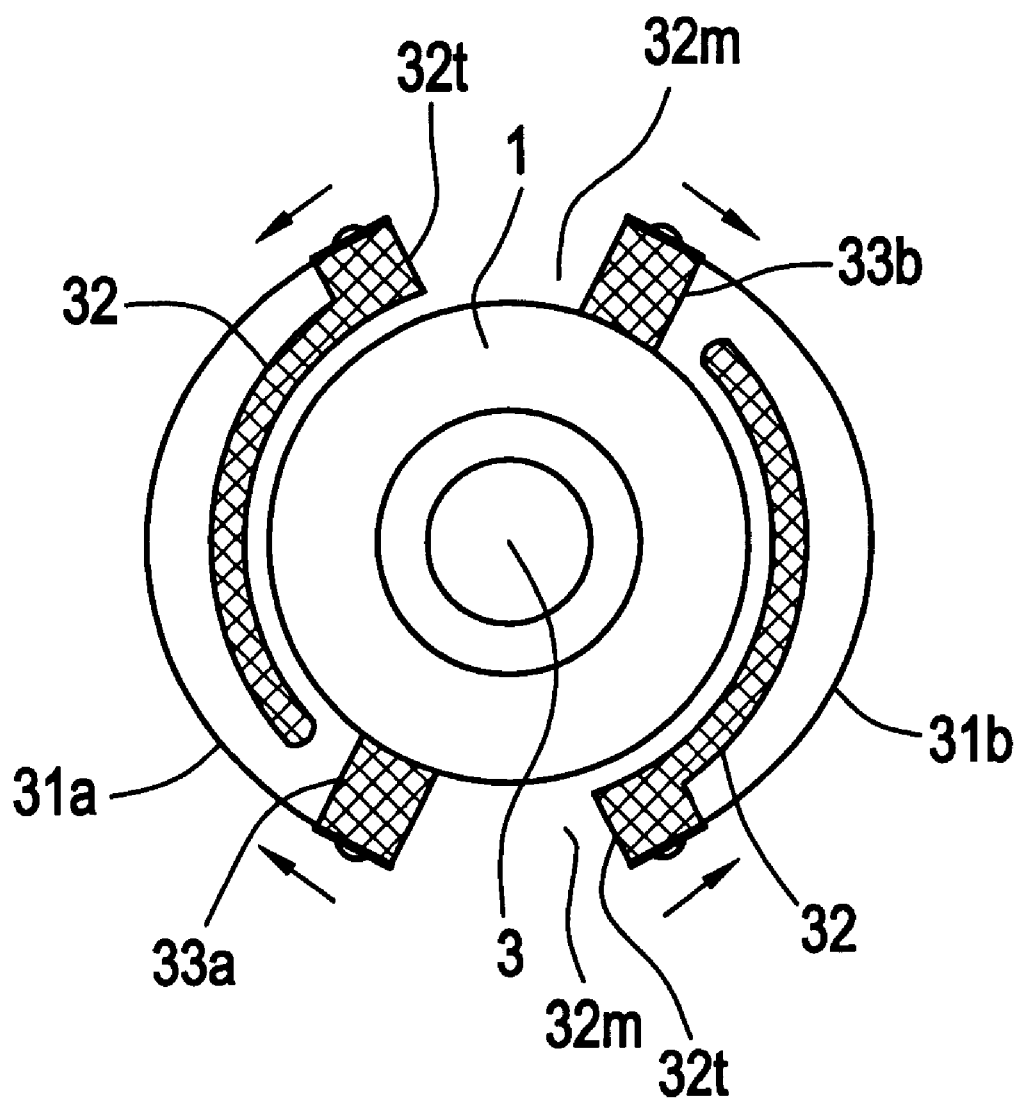
FIG. 3 is a sectional side view cut on line A—A of FIG. 1 when torque is applied to the torque detector according to Embodiment 1.
Figure 4:
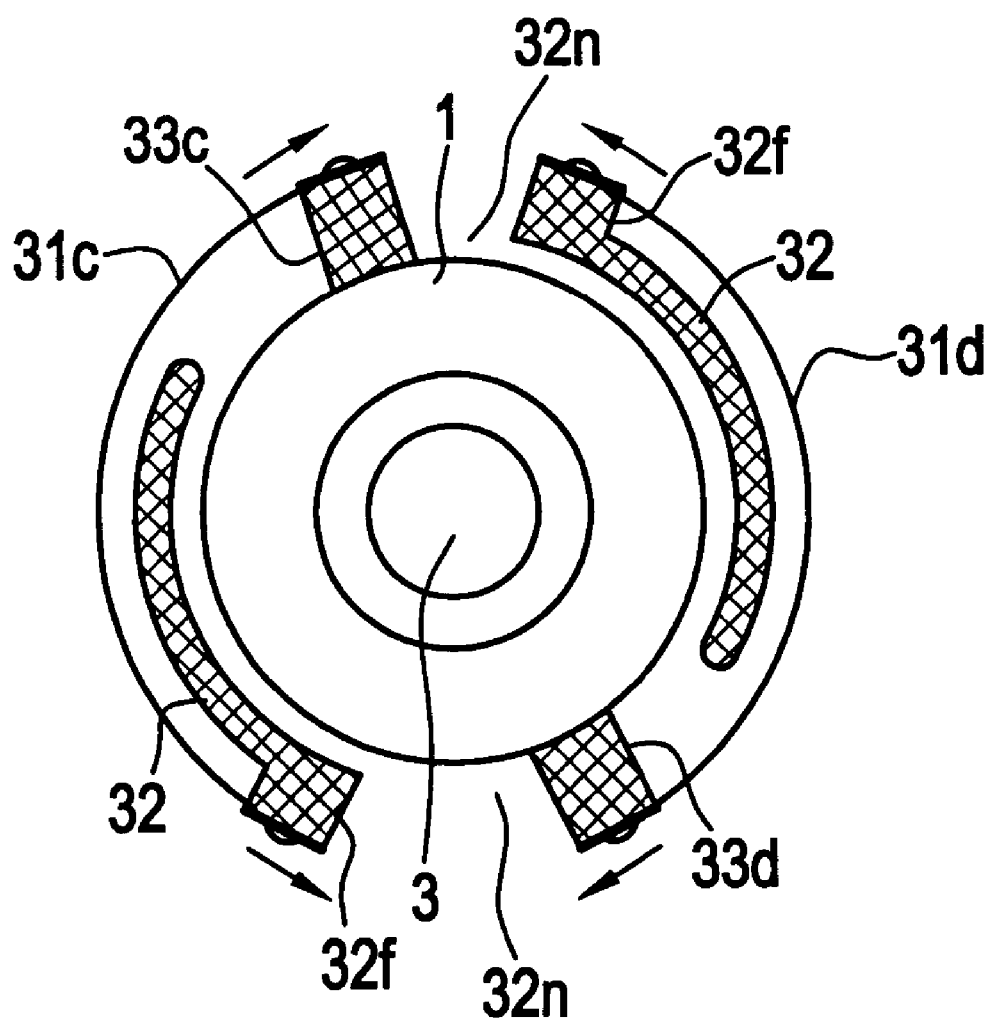
FIG. 4 is a sectional side view cut on line B—B of FIG. 1 when torque is applied to the torque detector according to Embodiment 1.

FIG. 3 and FIG. 4 are sectional views cut on line A—A and line B—B of FIG. 1, respectively, when torque having a direction shown by arrows is applied to the torque detector shown in FIG. 1. In these figures, 31a to 31d are arched movable bodies which are made of a cobalt amorphous flat belt, whose ends are fixed to the support member 32 and the other ends are fixed to the fixing members 33a to 33d so that they can be arched.

An end portion connected to the torsion bar 3 of the first shaft 1 has a cylindrical extension portion 1f which extends along the periphery of the torsion bar 3.

In this case, end portions of the first shaft 1 and the second shaft 2 have holes 1m and 2m, and the both ends of the torsion bar 3 are mated with the hole 1m of the first shaft 1 and the hole 2m of the second shaft 2, respectively. A pin hole 3a is formed in both ends of the torsion bar 3, and unshown pins are mated with these pin holes 3a through unshown holes formed in the first shaft 1 and the second shaft 2 to connect the torsion bar 3 to the end portions of the first shaft 1 and the second shaft 2.

Figure 2:
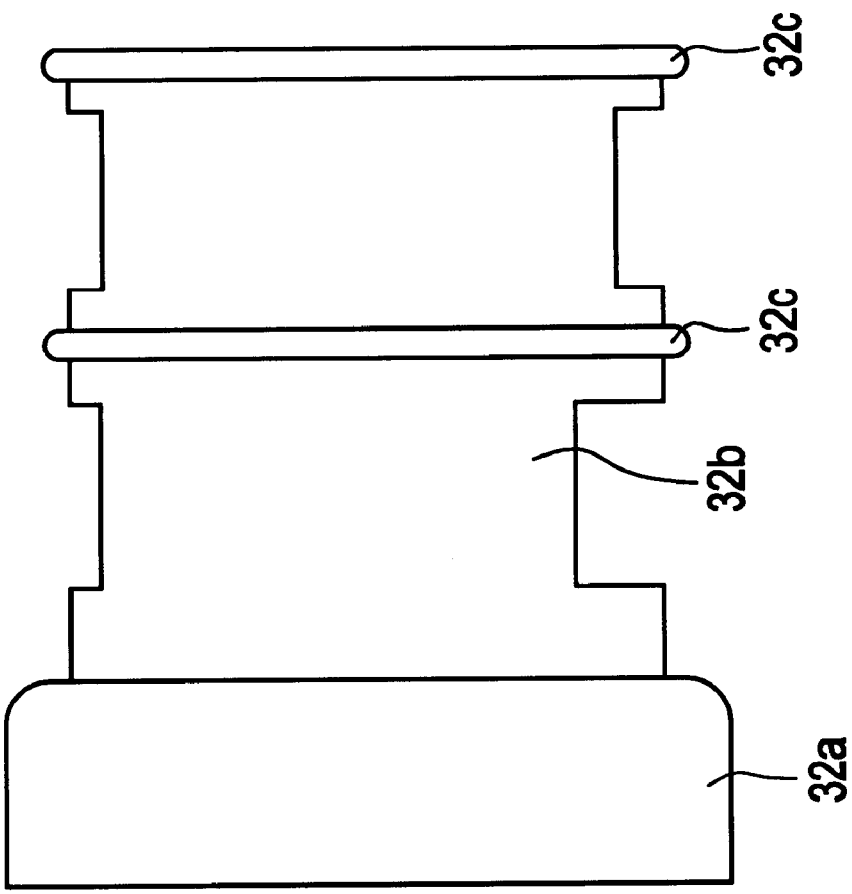
FIG. 2 is a side view of key parts of the torque detector according to Embodiment 1.

The support member 32 is made of a cylinder having an opening at both ends, consists of a large-diameter base portion 32a fixed to the end portion of the second shaft 2 and a body portion 32b projecting from the base portion 32a as shown in FIG. 2 and has ring-shaped ribs 32c at almost the center and end portions of the body portion 32b.

The support member 32 is formed with a resin mold, and the rib 32c is provided to prevent distortion at the time of molding and ensure strength after molding.

The cylindrical extension portion 1f projecting from the end portion of the first shaft 1 and the torsion bar 3 are fitted in the cylindrical support member 32 fixed to the second shaft 2.

The extension portion 1f of the first shaft 1 is cylindrical and fitted in the support member 32 without contact, and its end portion 1n is a small-diameter cylinder and rotably mated with a hole 2n at the outlet of the hole 2m in the end portion of the second shaft 2. A bush is placed between the end portion 1n and the inner wall of the hole 2n to support the first shaft 1 in such a manner that the first shaft 1 can rotate freely. Thanks to this support structure, even if force having a bending direction is applied to the first shaft 1 and the second shaft 2, the end portion 1n f the first shaft 1 is rotably supported by the bush in the hole 2n, thereby preventing the deformation in the bending direction of the first shaft 1 and the second shaft 2. Therefore, rigidity can be enhanced.

A pair of upper and lower openings 32m and 32m are formed on right and left sides of the body portion 32b with the center rib 32 interposed therebetween. The openings 32m and 32n are placed at opposite positions of the support member 32. The fixing member 33a and 33b project from the peripheral surface of the extension portion 1f of the first shaft 1 at positions corresponding to the upper and lower openings 32m and 32m, one ends of the movable bodies 31a and 31b which are made of a flat belt arched along the peripheral surface of the support member 32 and opposed to each other are fixed to the fixing members 33a and 33b with screws or the like, and the other ends of the movable bodies 31a and 31b are fixed to the fixing members 32t and 32t provided on the opening 32m sides of the support member 32 with screws or the like, respectively. Thus, one ends of the movable bodies 31a and 31b are fixed to the first shaft 1 through the extension portion 1f and the other ends thereof are fixed to the second shaft 2 through the support member 32. The upper ends of the movable body 31a is fixed to the fixing member 32t and the lower end thereof is fixed to the fixing member 33a whereas the upper end of the movable body 31b is fixed to the fixing member 33b and the lower end thereof is fixed to the fixing member 32t. Thus, the movable bodies 31a and 31b are attached reversibly.

As shown in FIG. 4, the fixing members 33c and 33d project from the peripheral surface of the first shaft 1 at positions corresponding to upper and lower openings 32n and 32n, one ends of the movable bodies 31c and 31d which are made of a flat belt arched along the peripheral surface of the support member 32 and opposed to each other are fixed to the fixing members 33c and 33d with screws or the like, and the other ends of the movable bodies 31c and 31d are fixed to fixing members 32f and 32f provided on the opening 32n sides of the support member 32 with screws or the like. Thus, one ends of the movable bodies 31c and 31d are fixed to the first shaft 1 and the other ends thereof are fixed to the support member 32. Also in this case, the movable bodies 31c and 31d are attached reversibly.

The center position in a longitudinal direction of the torsion bar 3 is located at a intermediate position between the assembly structure of the movable bodies 31a and 31b and the assembly structure of the movable bodies 31c and 31d. When the torsion bar 3 is twisted, the right and left portions of the torsion bar 3 with the center position in a longitudinal direction therebetween are displaced in opposite directions, whereby force is applied to the movable bodies 31a and 31b in opposite directions shown by arrows and the movable bodies 31a and 31b deform in opposite directions.

Thus, one ends of the movable bodies 31a, 31b, 31c and 31d are connected to the first shaft 1 through the extension portion if and the other ends thereof are connected to the second shaft 2 through the support member 32, thereby making it possible to detect torsion displacement between the first shaft 1 and the second shaft 2.

A description is subsequently given of the operation of the torque detector. When torque having a rotation direction shown by an arrow in FIG. 1 is applied to the first shaft 1 from the steering wheel, the torsion deformation of the torsion bar 3 occurs according to the amount of the torque. Then, a relative angular difference is generated between the first shaft 1 and the second shaft 2, thereby causing relative displacement in a circumferential direction between the fixing members 33a to 33d fixed to the extension portion if of the first shaft 1 and the support member 32 fixed to the second shaft 2. As shown in FIG. 3, the movable bodies 31a and 31b are compressed elastically from both sides and the center portions thereof deform in such a manner that they are swollen outwards whereas the movable bodies 31c and 31d are pulled from both sides and the center portions thereof deform in such a manner that they are depressed inward.

Magnetic flux generated by the first coil 21a passes through the yokes 22a and 22b and the movable bodies 31a and 31b and constitutes a magnetic circuit whereas magnetic flux generated by the second coil 21b passes through the yokes 22b and 22c and the movable bodies 31c and 31d and constitutes a magnetic circuit. Since the yokes and the movable bodies are made from a soft magnetic material and have extremely small magnetic resistance, the magnetic resistances of these magnetic circuits are mainly determined by the thickness of an air gap between the yokes and the movable bodies. Therefore, the inductance of the first coil 21a becomes large because the first coil 21a has small magnetic resistance due to a small air gap and the inductance of the second coil 21b becomes small because the second coil 21b has large magnetic resistance due to a large air gap. The amount of torsion of the torsion bar, that is, the amount of torque can be obtained by electrically detecting an inductance change.

Since the inductance of a coil is almost proportional to the inverse of an average air gap, when the torsion angle of the torsion bar is the same, a larger inductance change is obtained by reducing the initial value of the air gap than that of the torque sensor of the prior art having a tooth form structure, and a highly sensitive torque sensor can be obtained.

Therefore, since torque can be measured accurately even if the rigidity of the torsion bar is increased and the relative angular difference between the first shaft 1 and the second shaft 2 with respect to given torque is made small, the torque sensor can be used for such application that high rigidity is required.

As the inductance of the coil is changed not only by torque but also by temperature, two coils having similar temperature characteristics are provided and temperature compensation is carried out by amplifying a difference between changes in the inductances of the coils. Since output changes caused by temperature variations cannot be completely eliminated by this temperature compensation in fact, they can be the causes of some errors. However, as the torque sensor of this embodiment has high torque sensitivity as described above, it is hardly influenced by error factors such as temperature variations.

When the movable bodies 31a to 31d are elastically deformed by torque, if the movable bodies 31a to 31d are very thick, large stress is generated in the movable bodies by given deformation. Therefore, a very thin amorphous belt having high yield strength is used. In consideration of corrosion resistance, a cobalt-based amorphous belt is used.

Embodiment 2

Figure 5:
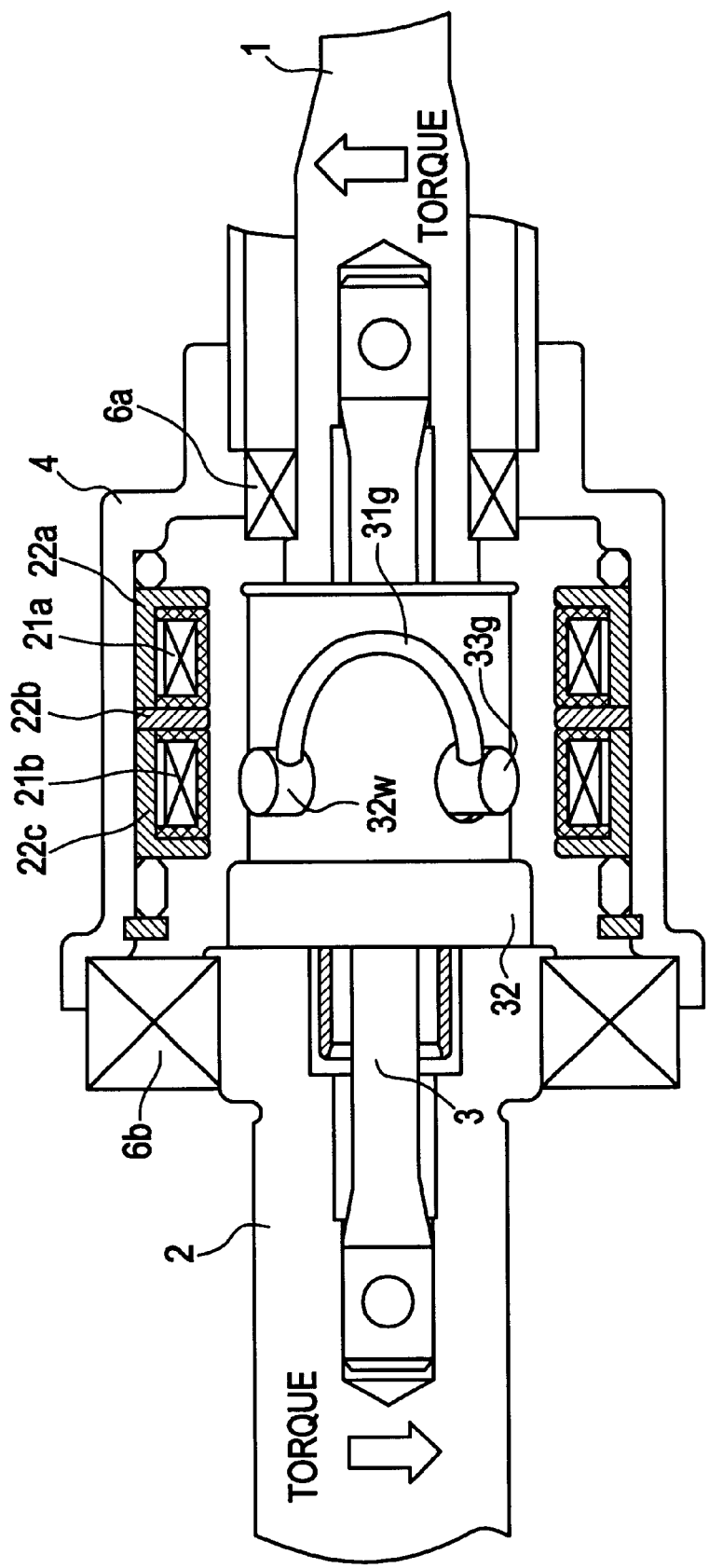
FIG. 5 is an elevation partly in section of a torque detector according to Embodiment 2 of the present invention.

FIG. 5 is an elevation partly in section of a torque detector according to Embodiment 2 of the present invention.

Reference numeral 32 denotes a cylindrical support member whose large-diameter portion at the left end is fixed to the second shaft 2 like Embodiment 1, and 33g a fixing member fixed to the peripheral surface of the extension portion 1f of the first shaft 1 and projecting from an opening formed in the support member 32. Reference member 32w is fixing member provided on the support member 32. A horizontal hole is formed in the movable body fixing portions of a fixing member 32w and the fixing member 33g and both ends of a linear movable body 31g arched in an axial direction is inserted into the holes. The movable body 31g is stretched between the horizontal holes formed in the fixing members 32w and 33g by its own spring force. In Embodiment 1, both ends of the movable bodies 31a to 31d are fixed to the fixing member 32 and the fixing members 33a to 33d so that they do not move. In this Embodiment 2, both ends of the movable body 31g are inserted into the holes (or grooves) so that the movable body 31g can rotate freely in a circumferential direction. This facilitates the assembly of the torque detector and does not generate flexural stress in the movable body fixing portions during operation, thereby making it possible to improve yield strength.

In Embodiment 1, when a relative angular difference is generated between the first shaft 1 and the second shaft 2 by torque, the center portion of the movable body displaces in a radial direction. In this Embodiment 2, when torque having a direction shown by arrows in FIG. 5 is applied, the movable body 31g is compressed and the center portion of the movable body 31g displaces to the right side of the figure in an axial direction. Then, the inductance of the coil 21a becomes larger than that of the coil 21b, and the amount of torque can be obtained by electrically detecting a change in the inductance of the coil 21a like Embodiment 1.

In the above Embodiments, the movable bodies are made from a soft magnetic material and displacement in a radial direction is obtained as a change in the magnetic resistance of a magnetic circuit. The displacement in a radial direction may be obtained using the principle of a known eddy current electrometer. When the coils and the movable bodies having the same constitution and shape as in FIG. 1 are used and the material of the movable bodies is changed from a magnetic material to a non-magnetic conductive material, if the center portion of each of the movable bodies displaces outwards according to the torsion of the torsion bar 3 and an alternating current is applied to the coils, an eddy current is readily generated in the movable bodies and the real number component of impedance of each of the coils increases. Torque can be obtained by electrically detecting this real number component.

In the example of FIG. 5, only one movable body 31g is provided on one side of the support member 32. Another movable body 31g may be provided on the opposite side as well.

In the example of FIG. 1, four movable bodies 31a to 31d are provided only one movable body may be provided.

According to the first aspect of the present invention, since the torque detector comprises an elastic member which is connected to the first shaft and the second shaft and displaced by torque having a torsion direction between the first shaft and the second shaft, movable bodies whose both ends are fixed to or supported by the first shaft and the second shaft, which are arched and whose center portions are displaced by a change in the curvature of the arch due to a change in the distance between both fixed ends of the movable bodies according to a relative torsion angle between the first shaft and the second shaft, and means of detecting the displacement of each of the movable bodies, a complex tooth form structure does not have to be machined accurately, and a torque sensor which can be assembled easily and can be produced at a low cost can be obtained. A torque sensor which has high sensitivity and high rigidity and is hardly influenced by error factors such as temperature variations can be obtained.

According to the second aspect of the present invention, since the movable bodies are arched along the circumferential directions of the first shaft and the second shaft, a compact torque detector can be obtained.

According to the third aspect of the present invention, since the movable bodies are arched in either one of the longitudinal directions of the first shaft and the second shaft, a compact torque detector can be obtained.

According to the fourth aspect of the present invention, since the movable bodies are made from a magnetic material and means of detecting the displacement of each of the movable bodies magnetically is provided, torque detection can be carried out easily and accurately.

According to the fifth aspect of the present invention, since the movable bodies are made from a conductive material and means of detecting the displacement of each of the movable bodies with an eddy current generated in the movable body, torque detection can be carried out easily and accurately.

According to the sixth aspect of the present invention, since the movable bodies are made of an amorphous belt, the structure becomes simple.

According to the seventh aspect of the present invention, the elastic member is shaped like a rod, a cylindrical support member is provided around the elastic member, an end portion connected to the elastic member of the first shaft is extended along the elastic member, the extension portion is inserted into the support member, the support member is fixed to an end portion of the second shaft, one ends of the movable bodies are connected to the extension portion of the first shaft through an opening formed in the support member, and the other ends of the movable bodies are connected to the support member. A torque detector having high sensitivity and is hardly influenced by error factors such as temperature variations can be obtained.

According to the eighth aspect of the present invention, the extension portion is a cylindrical portion located around the elastic member and an end portion of this cylindrical portion is mated with a hole formed in the end portion of the second shaft in such a manner that it can rotate freely. Therefore, rigidity can be enhanced.

What is claimed is:

1. A torque detector for detecting torque applied to a first shaft and a second shaft which are arranged coaxial to each other and whose ends are opposed to each other, the first shaft and the second shaft being connected together by an elastic member, the torque detector comprising:

movable bodies, each having one end connected to the first shaft and an other end connected to the second shaft, said movable bodies being arched and having center portions which are displaced in a radial direction, relative to a rotational axis of the first shaft and the second shaft, by a change in a curvature of the arch, due to a change in a distance between both of the ends of each of the movable bodies, according to a relative torsion angle between the first shaft and the second shaft; and means for detecting the displacement of each of the movable bodies, comprising:

first means for varying impedance according to the radial displacement of the center portions of each of the movable bodies, positioned to be next to the movable bodies in a radial direction relative to the rotational axis of the first shaft and the second shaft, intervening air gap provided between said movable bodies and said first means, and wherein the movable bodies are positioned closer to the rotational axis than said first means; and second means, electrically connected to said first means, for obtaining an amount of torque on the elastic member by detecting variation in the impedance of said first means.

2. The torque detector of claim 1, wherein the movable bodies are arched in circumferential directions of the first shaft and the second shaft.

3. The torque detector of claim 1, wherein the movable bodies are arched in either one of longitudinal directions of the first shaft and the second shaft.

4. The torque detector of claim 1, wherein the movable bodies are made from a magnetic material and said first means generates a magnetic flux, forming magnetic circuits with said movable bodies, wherein:

a thickness of the intervening air gap between each movable body and said first means varies with the displacement of the center portion, a magnetic resistance of each magnetic circuit substantially corresponds to the thickness of the intervening air gap, and the impedance of said first means is inversely related to the magnetic resistances of the magnetic circuits.

5. The torque detector of claim 1, wherein the movable bodies are made from a conductive material and an alternating field applied by said first means generates an eddy current in each movable body, wherein:

a thickness of the intervening air gap between each movable body and said first means varies with the displacement of the center portion, and the impedance of said first means is inversely related to the thickness of the intervening air gap.

6. The torque detector of claim 1, wherein the movable bodies are made of an amorphous belt.

7. The torque detector of claim 1, further comprising a cylindrical support member provided around the elastic member, said cylindrical support member having an opening formed in a circumferential surface, wherein:

an end portion of the first shaft, connected to the elastic member, is extended along the elastic member, the end portion of the first shaft that is extended along the elastic member is inserted into the support member, the support member is fixed to an end portion of the second shaft, the one end of each of the movable bodies is connected to the end portion of the first shaft through the opening formed in the circumferential surface of the support member, whereby the one end of each movable body is fixed to the first shaft, and the other end of each of the movable bodies is connected to the support member, whereby the other end of each movable body is fixed to the second shaft.

8. The torque sensor of claim 7, wherein the end portion of the first shaft that is extended along the elastic member is a cylindrical portion located around the elastic member and an end portion of this cylindrical portion is mated with a hole formed in the end portion of the second shaft in such a manner that the end portion of the cylindrical portion can rotate freely.

9. The torque detector according to claim 6, wherein the amorphous belt is cobalt-based.

10. The torque detector of claim 7, wherein the elastic member is shaped like a rod.

11. A torque detector for detecting torque applied to a first shaft and a second shaft which are arranged coaxial to each other and whose ends are opposed to each other, the first shaft and the second shaft being connected together by an elastic member, the torque detector comprising:

a movable body, having one end connected to the first shaft and an other end connected to the second shaft, said movable body being arched and having a center portion which is displaced in an axial direction, relative to a rotational axis of the first shaft and the second shaft, by a change in a curvature of the arch, due to a change in a distance between both ends of the movable body, according to a relative torsion angle between the first shaft and the second shaft; and means for detecting the displacement of the movable body, comprising:

first means for varying impedance according to the axial displacement of the center portion of the movable body, positioned in a radial direction relative to the rotational axis of the first shaft and the second shaft, to be next to at least the center portion of the movable body along at least a range of displacement that the center portion displaces in the axial direction, an intervening air gap provided between said movable body and said first means; and second means, electrically connected to said first means, for obtaining an amount of torque on the elastic member by detecting variation in the impedance of said first means.

12. The torque detector according to claim 11, further comprising:

a first fixing member connected to the first shaft; and a second fixing member connected to the second shaft, wherein the movable body is connected to said first shaft and said second shaft by inserting the ends of the movable body into holes or grooves formed in the first and second fixing members, and the ends of the movable body freely rotate within the holes or grooves.

13. The torque detector according to claim 11, wherein the movable body is positioned closer to the rotational axis than is said first means.

14. The torque detector of claim 11, wherein the movable body is made from a magnetic material and said first means generates a magnetic flux, forming a magnetic circuit with said movable body, wherein axial displacement of the center portion of the movable body causes a change of the impedance of said first means.

15. The torque detector of claim 11, wherein the movable body is made from a conductive material and an alternating field applied by said first means generates an eddy current in the movable body, wherein axial displacement of the center portion of the movable body causes a change of the impedance of said first means.

16. The torque detector of claim 11, further comprising a cylindrical support member, provided around the elastic member, said cylindrical support member having an opening formed in a circumferential surface, wherein:

an end portion of the first shaft, connected to the elastic member, is extended along the elastic member, the end portion of the first shaft that is extended along the elastic member is inserted into the support member, the one end portion of the movable body is connected to the end portion of the first shaft that is within the support member via said opening formed in the circumferential surface of the support member, whereby the one end of said movable body is connected to the first shaft, and the other end of each of the movable bodies is connected to the support member, whereby the other end of said movable body is connected to the second shaft.

17. The torque detector of claim 16, wherein the elastic member is shaped like a rod.

18. The torque of claim 16, wherein the end portion of the first shaft that is extended along the elastic member is a cylindrical portion located around the elastic member and an end portion of this cylindrical portion is mated with a hole formed in the end portion of the second shaft in such a manner that the end portion of the cylindrical portion can rotate freely.

* * * * *